US011119271B2

(12) United States Patent
Lee

(10) Patent No.: US 11,119,271 B2
(45) Date of Patent: Sep. 14, 2021

(54) TRIPLE CLAD FIBER

(71) Applicant: Nuburu, Inc., Centennial, CO (US)

(72) Inventor: Ian Lee, Highlands Ranch, CO (US)

(73) Assignee: Nuburu, Inc., Centennial, CO (US)

( * ) Notice: Subject to any disclaimer, the term of this patent is extended or adjusted under 35 U.S.C. 154(b) by 0 days.

(21) Appl. No.: 16/403,512

(22) Filed: May 4, 2019

(65) Prior Publication Data

US 2019/0361171 A1 Nov. 28, 2019

Related U.S. Application Data

(60) Provisional application No. 62/667,345, filed on May 4, 2018.

(51) Int. Cl.
  *G02B 6/38* (2006.01)
  *G02B 6/036* (2006.01)
  *G02B 6/42* (2006.01)

(52) U.S. Cl.
  CPC .......... *G02B 6/036* (2013.01); *G02B 6/3801* (2013.01)

(58) Field of Classification Search
  None
  See application file for complete search history.

(56) References Cited

U.S. PATENT DOCUMENTS

| | | |
|---|---|---|
| 2002/0172486 A1 | 11/2002 | Fermann |
| 2005/0232551 A1* | 10/2005 | Chang .................. G02B 6/3849 385/76 |
| 2007/0238801 A1* | 10/2007 | Chien .................. G02B 6/4482 522/64 |
| 2008/0219624 A1 | 9/2008 | Pimpinella |
| 2011/0249935 A1* | 10/2011 | Hu ............................ G02B 6/14 385/27 |
| 2012/0155818 A1* | 6/2012 | Chou .................. G02B 6/02395 385/123 |
| 2012/0321264 A1* | 12/2012 | Chatigny ............... G02B 6/245 385/126 |
| 2015/0009320 A1* | 1/2015 | Klein ...................... G01M 11/30 348/128 |
| 2016/0067780 A1 | 3/2016 | Nuburu |
| 2016/0067827 A1 | 3/2016 | Nuburu |
| 2016/0259140 A1 | 9/2016 | Optoskand |
| 2016/0322777 A1 | 11/2016 | Nuburu |
| 2017/0021454 A1 | 1/2017 | Joseph |
| 2017/0341144 A1 | 11/2017 | Nuburu |
| 2017/0341180 A1 | 11/2017 | Nuburu |

(Continued)

FOREIGN PATENT DOCUMENTS

WO WO 2018/061725 4/2018

OTHER PUBLICATIONS

• Hecht, Jeff ("High-Power Fiber Lasers", Optics & Photonics News, Oct. 2018, pp. 30-37.) (Year: 2018).*
Aug. 2, 2019, PCT, PCT/US2019/030758 Search and Option.

*Primary Examiner* — Michelle R Connelly
(74) *Attorney, Agent, or Firm* — Glen P. Belvis; Belvis Law, LLC.

(57) ABSTRACT

There is provided a multi-clad fiber assembly for reducing and eliminating deleterious laser-contaminant interrelations, and methods of making these assemblies. There is provided an optical connector having contaminants that are shielded from causing detrimental thermal effects, during laser beam transmittion, by preventing laser-contaminant interactions.

17 Claims, 3 Drawing Sheets

(56) References Cited

U.S. PATENT DOCUMENTS

| | | |
|---|---|---|
| 2017/0343729 A1 | 11/2017 | Nuburu |
| 2018/0236605 A1 | 8/2018 | Finuf et al. |
| 2018/0375296 A1 | 12/2018 | Nuburu |
| 2019/0025502 A1 | 1/2019 | Nuburu |
| 2019/0089983 A1 | 5/2019 | Nuburu |
| 2019/0273365 A1 | 9/2019 | Nuburu |
| 2019/0361171 A1 | 11/2019 | Nuburu |
| 2020/0086388 A1 | 3/2020 | Nuburu |
| 2020/0094478 A1 | 3/2020 | Nuburu |

* cited by examiner

TRIPLE CLAD FIBER

This application claims under 35 U.S.C. § 119(e)(1) the benefit of the filing date of U.S. provisional application Ser. No. 62/667,345, filed May 4, 2018, the entire disclosure of which is incorporated herein by reference.

BACKGROUND OF THE INVENTION

Field of the Invention

The present inventions relate to optical fibers, the coupling of light into optical fibers, and configurations of optical fibers to enhance the coupling of light into the fiber.

Infrared red (IR) based (e.g., having wavelengths greater than 700 nm, and in particular wavelengths greater than 1,000 nm) additive manufacturing systems suffer from, among other things, two short comings, which limit both the build volume and the build speed.

As used herein, unless expressly stated otherwise, "UV", "ultra violet", "UV spectrum", and "UV portion of the spectrum" and similar terms, should be given their broadest meaning, and would include light in the wavelengths of from about 10 nm to about 400 nm, and from 10 nm to 400 nm.

As used herein, unless expressly stated otherwise, the terms "high power", "multi-kilowatt" and "multi-kW" lasers and laser beams and similar such terms, mean and include laser beams, and systems that provide or propagate laser beams that have at least 1 kW of power (are not low power, e.g., not less than 1 kW), that are at least 2 kW, (e.g., not less than 2 kW), that are at least 3 kW, (e.g., not less than 3 kW), greater than 1 kW, greater than 2 kW, greater than 3 kW, from about 1 kW to about 3 kW, from about 1 kW t about 5 kW, from about 2 kW to about 10 kW and other powers within these ranges as well as greater powers.

As used herein, unless expressly stated otherwise, the terms "visible", "visible spectrum", and "visible portion of the spectrum" and similar terms, should be given their broadest meaning, and would include light in the wavelengths of from about 380 nm to about 750 nm, and 400 nm to 700 nm.

As used herein, unless specified otherwise, "optical connector", "fiber optics connector", "connector" and similar terms are to be given their broadest possible meaning and include any component from which a laser beam is or can be propagated, any component into which a laser beam can be propagated, and any component that propagates, receives or both a laser beam in relation to, e.g., free space, (which would include a vacuum, a gas, a liquid, a foam and other non-optical component materials), an optical component, a wave guide, a fiber, and combinations of the forgoing.

As used herein, unless expressly stated otherwise, the term "proximal end" of a component, such as an optical fiber, will refer to the end that is closest to the laser source when the component is in optical communication with the laser source, e.g., the end that is receiving the laser beam. As used herein, unless expressly stated otherwise, the term "distal end" of component, such as an optical fiber, will refer to the end that is optically furthest away from the laser source when the component is in optical communication with the laser source, e.g., the end from which the laser beam is launched or propagated.

As used herein, unless expressly stated otherwise, the terms "blue laser beams", "blue lasers" and "blue" should be given their broadest meaning, and in general refer to systems that provide laser beams, laser beams, laser sources, e.g., lasers and diodes lasers, that provide, e.g., propagate, a laser beam, or light having a wavelength from about 400 nm to about 500 nm.

As used herein, unless expressly stated otherwise, the terms "green laser beams", "green lasers" and "green" should be given their broadest meaning, and in general refer to systems that provide laser beams, laser beams, laser sources, e.g., lasers and diodes lasers, that provide, e.g., propagate, a laser beam, or light having a wavelength from about 500 nm to about 575 nm.

Generally, the term "about" as used herein, unless specified otherwise, is meant to encompass a variance or range of ±10%, the experimental or instrument error associated with obtaining the stated value, and preferably the larger of these.

As used herein unless specified otherwise, the recitation of ranges of values herein is merely intended to serve as a shorthand method of referring individually to each separate value falling within the range. Unless otherwise indicated herein, each individual value within a range is incorporated into the specification as if it were individually recited herein.

This Background of the Invention section is intended to introduce various aspects of the art, which may be associated with embodiments of the present inventions. Thus, the forgoing discussion in this section provides a framework for better understanding the present inventions, and is not to be viewed as an admission of prior art.

SUMMARY

The present inventions advance the art and solve the long standing need for efficiently coupling light, and in particular high power laser beams, into optical fibers and transmitting light through those fibers. The present inventions, among other things, advance the art and solve these problems and needs by providing the articles of manufacture, devices and processes taught, and disclosed herein.

There is provided the use a triple clad fiber to protect laser light interactions with the housing or materials in the housing.

Further there is provided the use of a secondary cladding to protect light interaction with a contaminant or other material that can lead to thermal, optical damage or damage to the fiber functionality due to outgassing of materials from contaminants due to light interaction at the cladding interface.

Moreover, there is provided a triple clad fiber design with an optional end cap.

Yet further, there is provided these methods, fibers and assemblies, having one or more of the following features: wherein the cladding defines an outer surface; and, wherein the outer surface has a contaminant.

Still further there is provided a fiber optic connector assembly having: a triple clad fiber having a proximal and distal end, defining a length therebetween; the fiber having a core, an inner cladding in direct contact with the core, a second cladding adjacent to inner cladding, and an outer cladding adjacent to the second cladding; wherein along a proximal portion of the length of the fiber the outer cladding has been removed, defining a proximal length of the fiber and exposing an outer surface of the second cladding along the proximal length, the outer surface having contaminants; and, the proximal length positioned within an inner cavity of a connector, whereby the contaminants are located between an inner surface of the connector and the outer surface of the second cladding; whereby, the contaminants are shielded by the second cladding from laser energy in the inner cladding; thereby minimize detrimental thermal effects from laser-contaminant interactions.

In addition, there is provided these methods, fibers and assemblies, having one or more of the following features: wherein the connector has an end cap and the proximal end of the fiber is optically connected to the end cap; wherein the distal end of the fiber is optically connected to a single clad fiber; wherein the optical connection is a splice; wherein the single clad fiber has a mode stripper; wherein the contaminants cover more than about 5% of a surface of the proximal length of the fiber; and, wherein the contaminants cover more than about 10% of an outer fiber surface that is in contact with an inner surface of the connector.

Further, there is provided a fiber optic connector assembly having: a fiber having a proximal and distal end, defining a length therebetween; the fiber having a core, an inner cladding in direct contact with the core, a second cladding adjacent to inner cladding; the second cladding having an area along the length of the fiber, wherein an outer surface of the fiber is contaminated with contaminants which upon interaction with a laser beam cause thermal degradation of the fiber; thereby defining an outer contaminated area; and, the outer contaminated area in direct contact with an inner surface of a connector; whereby, the contaminants are shielded by the second cladding from laser energy in the inner cladding; thereby preventing thermal degradation of the fiber.

Additionally, there is provided the method of transmitting a laser beam through these assemblies; wherein the laser beam has one or more of the following features: a power of from about 1 W to about 10 kW; a power of from about 1 W to 50 kW; a power from about 5 W to 2 kW; a blue wavelength; blue green wavelength; a green wavelength; and wherein no thermal degradation of the assembly occurs.

Furthermore, there is provided a method of making a contaminated optical connector that does not thermally degrade when transmitting a laser beam, the method having: obtaining a triple clad optical fiber; the fiber having a core, an inner cladding adjacent to the core, a second cladding adjacent to the inner cladding, and an outer cladding adjacent to the second cladding; removing a portion of the outer cladding, thereby exposing a surface of the second cladding; the surface of the second cladding having contaminants, thereby defining a contaminated outer surface; and, inserting a proximal end of the optical fiber into a connector; wherein at least a portion of the contaminated surface is in direct contact with an inner surface of the connector; whereby, the contaminants are shielded by the second cladding from laser energy in the inner cladding; thereby preventing detrimental thermal effects from laser-contaminant interactions.

Still further, there is provided transmitting a laser beam having a power of from about 10 W to about 20 kW through a contaminated optical connector assembly having a triple clad fiber, without causing detrimental thermal effects to the fiber or the connector from contamination in the assembly.

In addition, there is provided these methods, fibers and assemblies, having one or more of the following features: The method of claim 11, wherein the contaminates are located between an outer surface of a fiber and an inner surface of a body of the connector.

Moreover, there is provided these methods, fibers and assemblies, having one or more of the following features: wherein the laser energy is transmitted for a total duration of at least 1,000 hours without causing detrimental thermal effects; wherein the laser energy is transmitted for a total duration of at least 100 hours without causing detrimental thermal effects; wherein the laser energy is transmitted for a total duration of at least 500 hours without causing detrimental thermal effects; wherein the laser energy is transmitted for a total duration of at least 1,000 hours without causing detrimental thermal effects; wherein the laser beam is transmitted for from 1 to 500 duty cycles of the laser system without causing detrimental thermal effects; wherein the laser beam is transmitted for from 1 to 2,000 duty cycles of the laser system without causing detrimental thermal effects; wherein the laser beam is transmitted for more than 500 duty cycles of the laser system without causing detrimental thermal effects; wherein the laser beam is transmitted for more than 1,000 duty cycles of the laser system without causing detrimental thermal effects; and wherein the laser beam is transmitted for more than 5,000 duty cycles of the laser system without causing detrimental thermal effects.

Still further, there is provided a method of assembling a component for use in a laser system configured for a laser beam having a power of about 50 W to about 50 kW, the method having the following steps: providing an optical fiber having a core, a first cladding surrounding the core, and a second cladding surround the first cladding, and an outer layer surrounding the second cladding; removing the outer layer, thereby exposing an outer surface of the second cladding; whereby contaminants are associated with the outer surface; inserting the fiber into a structure having a cavity, the cavity defining an inner surface; leaving at least about 100% of the contaminants associated with the outer surface; inserting the optical fiber into the cavity, whereby the contaminants are positioned between the outers surface and the inner surface; wherein the fiber is capable of receiving and propagating a laser beam having a power from about 50 W to about 50 kW without being damaged from interactions between the laser beam and the contaminants.

Yet still further, there is provided these methods, fibers and assemblies, having one or more of the following features: wherein the outer surface is not capable of being cleaned; wherein the outer surface is not polished; wherein the inner surface has contaminants associated with it; wherein the inner surface is not cleaned; wherein 90% of the contaminants are left; wherein 80% of the contaminants are left; wherein 50% of the contaminants are left; wherein 20% of the contaminants are left; wherein the contaminants are on the outer surface; wherein the contaminants are imbedded in the outer surface; wherein after insertion the contaminants are embedded in the inner and outer surfaces; wherein the structure is a ferrule; wherein the inner and outer surfaces are in direct contact; wherein the laser power is about 50 W to 1 kW; wherein the laser power is about 1 W to 10 W; wherein the power is about 100 W to about 500 W; wherein the power is about 100 W to about 200 W; wherein the power is about 150 W; and, wherein the power is about 1 kW to about 20 kW.

DESCRIPTION OF THE PREFERRED EMBODIMENTS

Figure 1:
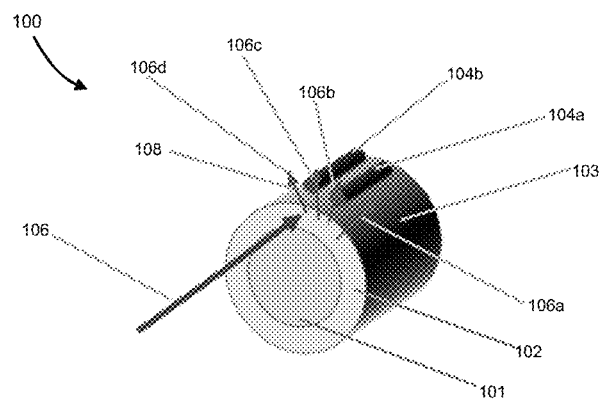
FIG. 1 is a perspective view of a prior art fiber, illustrating the problem with these fibers.

In general, the present inventions relate to configuration of optical fibers and in particular optical fiber for transmitting high power laser beams. Embodiments of the present inventions relate to configurations of optical fibers, optical connectors, optical couplers and optical fiber splices for mitigating and eliminating the determinate effects of contaminants that are located outside of the fiber's core.

Thus, in general, an optical fiber can have a core, a cladding and may have additional claddings, as well as a coating, and other protective layers. The fibers, for example, can be a hollow core photonic crystal or solid core photonic crystal. Typically, the fiber cladding surrounds the fiber core, and the coating, if present, surrounds the cladding, and other protective layers, if present, surround the coating. The core typically has a circular cross sections, although other shapes, such as square, are contemplated. In embodiments the fiber, or a section of the length of the fiber, has no cladding.

The fiber can be single mode or multimode. If multimode, the numerical aperture (NA) of embodiments may range from 0.1 to 0.6.

The core can be composed of fused silica. The core, which can have a cross section, e.g., diameter, of from about 5 microns (µm) to about 1,500 µm, about 10 µm to about 1,000 µm, about 8 µm to about 65 µm, including all diameters within this range as well as larger and smaller diameters.

The cladding can be composed of fluorine doped fused silica or other materials a such as fused silica doped with index-altering ions (e.g., germanium). The cladding thickness depends to some degree on the diameter of the core, however, the cladding thickness can be from about 10 µm microns to about 300 µm, about 40 µm to about 250 µm, and about 20 µm to about 150 µm, including all thicknesses within this range as well as larger and smaller thicknesses. As used herein with respect to a multi-layer structure, the term "thickness" means the distance between the layer's inner diameter (or inner surface) and its outer diameter (or outer surface). The thickness of the cladding is dependent upon single mode or multimode configuration and can be relative to the core size and the intended wavelength. In general, the outer diameter of the cladding should be 1.1 to 1.2 times larger times the core outer diameter, or more.

Typically, in embodiments of step index fibers, the index of refraction in the core is constant, and the refractive index of the cladding is lower than that of core. In multi clad fibers the refractive indices of cladding can vary. In embodiments, the fiber can be a gradient index fiber, typically in which the refractive index of the core decreases as the distance from the optical axis (e.g., center) of the fiber increases.

The coating can be for example an acrylate polymer, a polyimide, or other materials.

In general, when light, e.g., laser beams, and blue, blue-green and green laser beams, is coupled, e.g., launched into, an optical fiber, e.g., a typical step index fiber, some of the light enters the cladding layer, as well as the core. As a result of the lighting being launched into the cladding the light interacts with contaminants that are present in the cladding, on the surface of the cladding, or both. The contaminants may also be present on the inner surface of a component, where that inner surface is in direct contact with the outer surface of the optical fiber, such as when a fiber is interested into a ferrule.

For example, in assembling various laser and optical systems, the fiber is stripped of its outer non-glass cladding materials, e.g., the coatings and protective lawyers. This is done for various reasons, including to prevent damage to these outer non-glass layers from interaction with laser light. This interaction can lead to scattering with can cause further interactions, heating and thermal reactions, and other detrimental phenomena that can damage the fiber, components of the system and both.

When these layers are removed, however, contaminants are generally left behind. These contaminants can be, for example dirt, epoxy or polishing compounds that become trapped on or in the fiber, or that are present between the outer surface of the fiber and the inner surface of a component that the fiber is positioned in, e.g., a ferrule. Thus, for example, these contaminants can be located between a connector ferrule and the fiber.

It is believed to be very difficult, and costly, and at times impractical, to physically remove these contaminants, and to do so in a manner that does not damage the physical and optical properties of the fiber.

In some systems, significant power can be propagated in the fiber cladding due to launch conditions at the proximal end, or back reflections at the distal end of the fiber. This can lead to thermal damage of the fiber or outgassing of materials from the ferrule that lead to fiber degradation. The outgassed material can also deposit on the fiber face leading to a loss of functionality of the fiber.

The material trapped around the fiber cannot be easily mitigated due to the construction process.

Thus, turning to FIG. 1, is a perspective schematic view of an embodiment of a prior optical fiber illustrating the problem with cladding laser energy interacting with contaminants associated with the cladding. The optical fiber 100 has a core 101, surrounded by a cladding 102. The cladding has an outer surface 103, having contaminants 104a, 104b on, in, or otherwise mechanically, chemically, or both, associated with the surface 103, cladding 102 or both. Cladding light energy shown by arrow 106, can escape the cladding, shown by arrows 106a, 106b, 106c and 106d. This light escaping the cladding interacts with the contaminants 104a, 104b causing undesirable thermal interactions 108 that can degrade and damage the fiber.

Embodiments of the present inventions solve this problem, by reducing and preferably eliminating the cladding laser energy interaction with such contaminants. In this manner this deleterious interaction is avoided, without the need to remove the contaminants.

Figure 2:
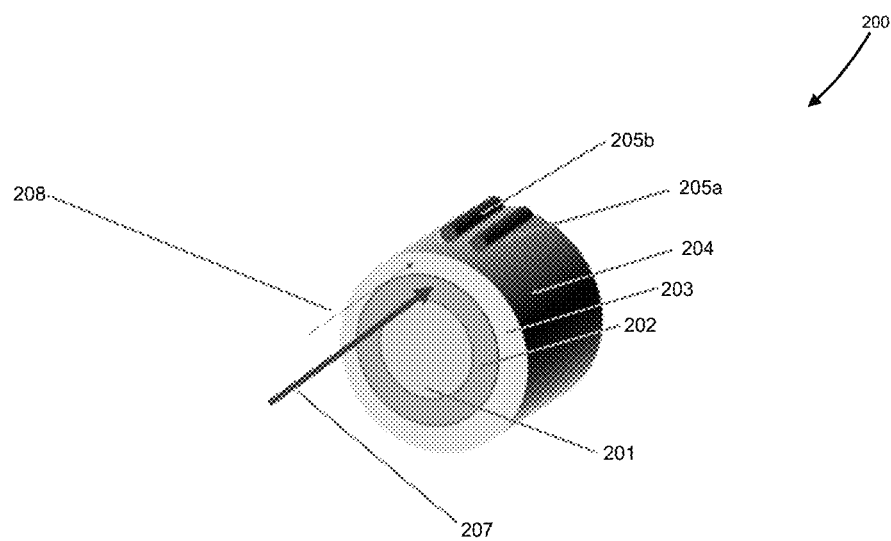
FIG. 2 is a perspective view of an embodiment of an optical fiber in accordance with the present inventions.

Turning to FIG. 2 there shown a perspective schematic view of an embodiment of a fiber configuration that addresses, mitigates and preferably eliminates these deleterious laser-contaminant interactions. A solution to the problem can be achieved by the use of an embodiment of a triple clad fiber 200. The triple clad includes a non-glass material such as acrylate. This non-glass layer is removed from a small region of the fiber (and thus not shown in the Figure) during the fiber optic connector assembly process. The fiber 200 has a core 201 a first cladding 202 and a second cladding 203, the second cladding 203 has an outer surface 204. The fiber has contaminants 205a, 205b. The contaminants 205a, 205b may be on, in, or otherwise mechanically, chemically, or both, associated with the surface 205, cladding 203 or both. It being understood that typically the contaminants are on the surface 205. By sizing the first and second cladding dimensions, e.g., a first cladding of 230 um to 250 µm outer diameter and a second cladding diameter of 280 µm diameter, correctly light launched in the fiber or focused back into the fiber via back reflections can be contained primarily by the first cladding with a significantly smaller portion of the light in the second cladding. Cladding light energy 207, which can be higher powers, may be launched into the first cladding 202, very weak cladding light energy 208 may also be launched into the second cladding 203. The second cladding 203 shields any contaminants, e.g., 205a, 205b from interacting with the higher power cladding light energy 207. The cladding 203 also shields the contaminants from light energy launched into the core 201, that may leak into the first cladding 202. The power transport reduction in the second cladding minimizes, and preferably eliminates, at the intended, e.g., specified, power levels for use of the fiber, the potential for outgassing materials or thermal damage to the fiber. The configuration of this embodiment of fibers reduces, minimizes and preferably eliminates the detrimental thermal effects that otherwise would have been caused by contaminants associated with the outer surface of the fiber. In this manner, as further illustrated by other embodiments and teachings of this specification, embodiments of the present fibers can be safely, successfully and efficaciously used in connectors, couplers and other optical devices, or interfaces, while having contaminants on their surfaces, and for example, contaminants on the surfaces of the fiber that contact or are adjacent to the surfaces of the optical devices the fibers are associated with. Thus, avoiding complex and expensive cleaning steps, which nevertheless, may not be successful in eliminating such contaminants. Further, it being understood that in some instances, e.g., critical use applications, such cleanings steps may be, but are not required to be, used as a quality enhancing production step for the present fibers.

Embodiments of the present inventions, employ this triple-clad fiber configuration, as a part of a component or configuration in various laser and optical systems at locations where fibers, are connected to other components, laser beams are launched or received, back reflections are received, and fiber-to-fiber connections are made, to name a few.

Figure 3:
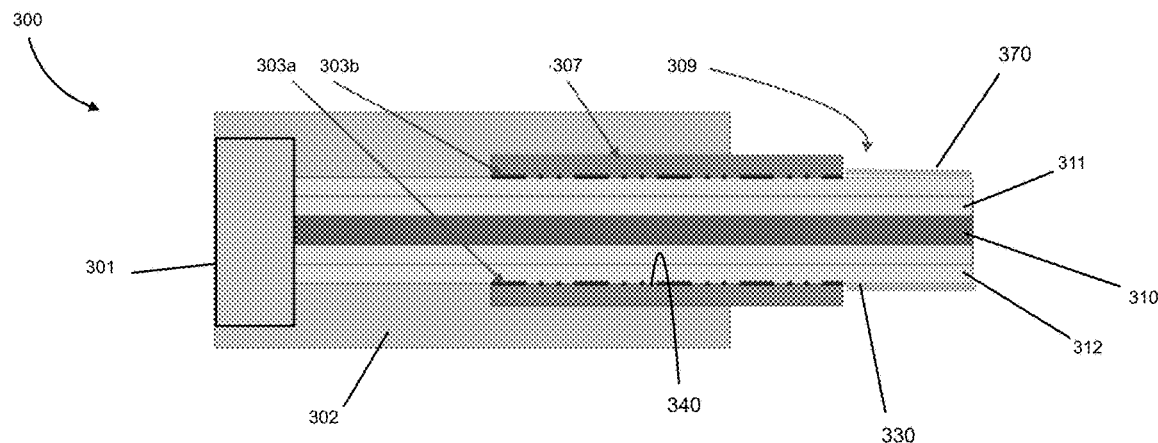
FIG. 3 is a cross sectional view of an embodiment of an optical fiber connector in accordance with the present inventions.

Turning to FIG. 3 there is shown a cross section schematic of an embodiment of a fiber connector structure 300 that addresses, mitigates and preferably eliminates these deleterious laser-contaminant interactions. A fiber 309 consisting of an optical core 310 in the range of 200 um diameter with a nominal NA of 0.22 surrounded by a first cladding 311 of outer diameter 250 µm with an NA of 0.24. The first cladding 311 to allow a launched high power laser beam to propagate in the core 310. A second cladding 312 of outer diameter 280 µm with an NA of 0.26. The second cladding 312 to contain light in the first cladding, allowing it to be transmitted in the first cladding and minimize any light propagation in the second cladding 312. The fiber length will be long enough to protect the fiber optic connector 302 and ferrule 307 structure with any associated contaminants 303a, 303b, before it is spliced to a conventional single clad fiber which can then interact with a fiber optic mode stripper.

The outer non-glass layer 370 of the triple clad fiber 309 is show. It can be seen that this layer 370 has been stripped from the fiber 309 for the sections of the fiber 309 that are within the connector body 302.

The fiber connector structure 300 has a connector body 302, that houses an end cap 301, a ferrule 307 and the optical fiber 309. The optical fiber 309 is in optical communication with the end cap 301. Preferably, the optical fiber 309 is mechanically and optically connected to the end cap 301.

The contaminants are illustrated in the figure as the darker lines and dashes, e.g., 303a, 303b. The contaminants are located between the outer surface 330 of the second cladding 312 of the fiber and the inner surface 340 of the ferrule 207.

Figure 4:
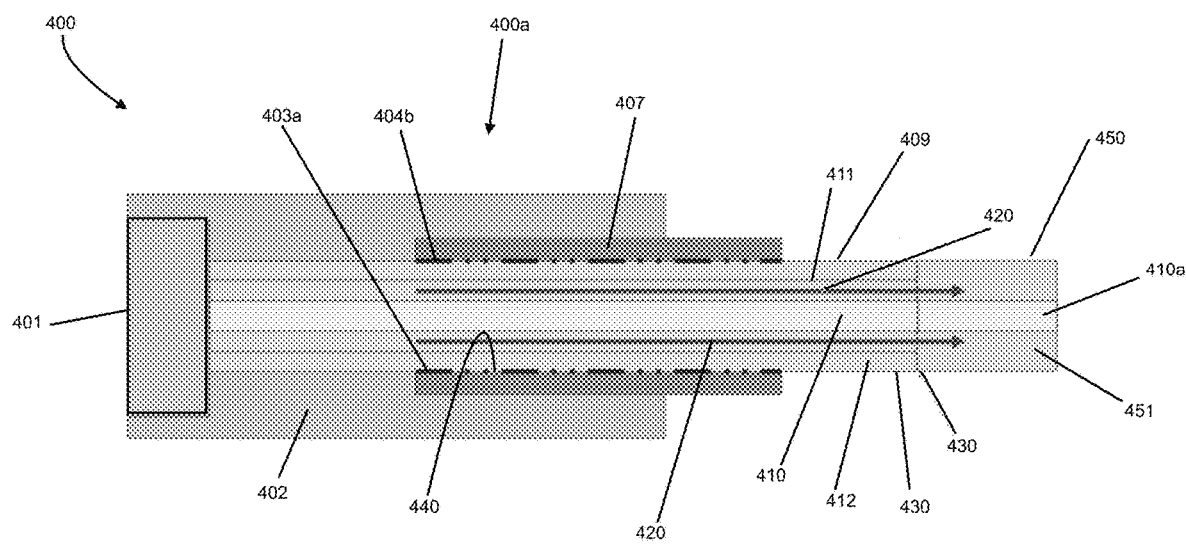
FIG. 4 is a cross sectional view of an embodiment of a fiber splice in accordance with the present inventions.

Turning to FIG. 4 there is shown a cross section schematic of an embodiment of a fiber splice structure 400 that addresses, mitigates and preferably eliminates deleterious laser-contaminant interactions. In this embodiment there is a fiber connector structure 400a. A fiber 409 consisting of an optical core 410 in the range of 200 um diameter with a nominal NA of 0.22 surrounded by a first cladding 411 of outer diameter 250 µm with an NA of 0.24. The first cladding 411 to allow a launched high power laser beam to propagate in the core 410. A second cladding 412 of outer diameter 280 µm with an NA of 0.26. The second cladding 412 to contain light in the first cladding, allowing it to be transmitted in the first cladding and minimize any light propagation in the second cladding 412. (Other core diameters and cladding thicknesses may be used, as for example those set forth in this specification.)

The fiber connector structure 400a has a connector body 402, that houses an end cap 401, a ferrule 407 and the optical fiber 409. The optical fiber 409 is in optical communication with the end cap 401. Preferably, the optical fiber 409 is mechanically and optically connected to the end cap 401.

The contaminants are illustrated in the Figure as the darker lines and dashes, e.g., 403a, 403b. The contaminants are located between the outer surface 430 of the fiber 409 and the inner surface 440 of the ferrule 407.

The fiber 409 length is long enough to protect the fiber optic connector 402 and ferrule 407 structure having associated contaminants 403a, 403b, before the splice 430 to a conventional single clad fiber 450 (having core 410a and cladding 451).

As illustrated by arrows 420 the direction of travel of the light energy in cladding 411 is away from the end cap 401 and toward and through the splice 430 and into the cladding 451. Thus, in this embodiment the cladding light is launched through the splice into the cladding of a second fiber. In it understood that the core can be a larger diameter and thus have the cladding light from the inner cladding of a dual clad fiber be launched into the core of a single clad fiber.

All combinations of fibers having two, three or more ("n") cladding layers, being optically connected to, e.g., spliced, to fibers having n–1 or n–2 cladding layers are contemplated, with the laser light preferably traveling from the fiber having greater cladding layers to the fiber having fewer cladding layers. Embodiments may also have both fibers, which are optically connected, having the same number of cladding layers.

Figure 5:
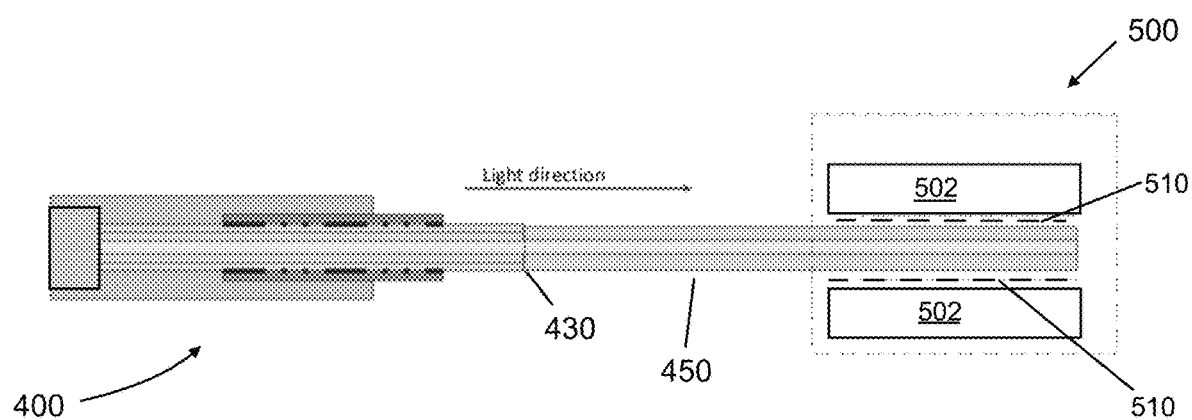
FIG. 5 is a cross sectional view of an embodiment of a cladding light mode stripper in accordance with the present inventions.

Turning to FIG. 5 there is a cross section schematic view of an embodiment of a model stripper and splice configuration that addresses, mitigates and preferably eliminates deleterious laser-contaminant interactions. In this embodiment the fiber spice structure 400 (from the embodiment of FIG. 4, all structures are the same, lead lines have been eliminated for simplicity and like numbers refer to like structures) has its single clad fiber 450 having a mode stripper region 500. The region 500 has mode stripper 510, that removes the cladding light from the cladding, transferring it to heat sink element 502, where this energy is converted to heat and dissipated or otherwise removed.

In embodiments of the schematic shown in FIG. 5, the light that propagates from the inner cladding 412 is removed via a mode stripper 500, located proximal from the splice

450. Beyond the mode stripper 500, the fiber 450 can be buffered with acrylate or silicone cladding and buffer materials.

Embodiments of the present inventions reduce and preferably eliminate the need to remove contaminants associated with the outer surface of the fiber, e.g., the outer surface of the cladding layer, the inner surface of a cavity that will be receiving the outer surface in an assembly, and both. In this manner, the need for expensive, time consuming, and potentially damaging cleaning and polishing steps are minimized, reduced and preferably eliminated in the manufacturing of the assembly.

In embodiments 100%, about 5% to about 99%, about 10%, about 20%, about 25% to about 90%, about 50% or more, about 70% or more, about 60% to 100%, and all percentages within these ranges, of the contaminants can be left associated with the surfaces during manufacturing of the assembly, and remain in the final assembly, without giving rise to laser-contaminant interactions during propagation of the laser beam. Thus, for example from 1% to 100% of the outer surface of the fiber that is in direct contact with the inner surface of the interface device, e.g., the ferrule inner surface, or a connector inner surface, can have contaminants on it. Further, from about 1% to about 25%, about 5% to about 70%, about 15% to about 30%, and about 20% to about 80% of this outer fiber surface can have contaminants on it, with giving rise to laser-contaminant interactions during propagation of the laser beam.

The present embodiments find application in high power laser systems, such as welding, cutting, additive manufacturing, additive-subtractive manufacturing, and other laser processing systems, including industrial, manufacturing, telecommunication and medical systems. They find application with laser energy of all wavelengths, among others, that of light, including UV, visible and IR wavelength laser beams. They find application with laser systems of various power laser beams, e.g., 0.01 kW to 0.1 kW, 0.1 to 0.5 kW, 0.5 kW, about 1 kW, about 5 kW, about 10 kW, about 20 kW, about 50 kW, about 1 kW to about 20 kW, about 5 kW to about 50 kW, about 10 kW to about 40 kW, and all powers within these ranges, as well as high and lower powers.

In an example of an embodiment of these multi-clad fibers, the fiber splice, and the cladding light mode stripper are configured for operating in a system utilizing laser energy in the 100 to 200 W range, and preferably 150 W. This system can be for example a laser welding system or a 3-D printer, a laser welder, a laser cutter and similar types of laser manufacturing systems.

In an embodiment, preferable wavelengths for system using the present fiber, connection and spice structures are wavelengths in the blue and green wavelengths, including wavelengths of 450 nm, 515 nm. In embodiments, the blue and green wavelength beams having beam quality of from 21 to 12 mm mrad, from 10 to 70 mm mrad, from 15 mm mrad to less than 1 mm mrad, less than about 15 mm mrad, less than about 10 mm mrad, less than about 5 mm mrad, and about 1 mm mrad, and all values within these ranges and greater and smaller values as well.

It is noted that there is no requirement to provide or address the theory underlying the novel and groundbreaking processes, materials, performance or other beneficial features and properties that are the subject of, or associated with, embodiments of the present inventions. Nevertheless, various theories are provided in this specification to further advance the art in this area. The theories put forth in this specification, and unless expressly stated otherwise, in no way limit, restrict or narrow the scope of protection to be afforded the claimed inventions. These theories many not be required or practiced to utilize the present inventions. It is further understood that the present inventions may lead to new, and heretofore unknown theories to explain the function-features of embodiments of the methods, articles, materials, devices and system of the present inventions; and such later developed theories shall not limit the scope of protection afforded the present inventions.

The various embodiments of systems, equipment, techniques, methods, activities and operations set forth in this specification may be used for various other activities and in other fields in addition to those set forth herein. Additionally, these embodiments, for example, may be used with: other equipment or activities that may be developed in the future; and with existing equipment or activities which may be modified, in-part, based on the teachings of this specification. Further, the various embodiments set forth in this specification may be used with each other in different and various combinations. Thus, for example, the configurations provided in the various embodiments of this specification may be used with each other; and the scope of protection afforded the present inventions should not be limited to a particular embodiment, configuration or arrangement that is set forth in a particular embodiment, example, or in an embodiment in a particular Figure.

The invention may be embodied in other forms than those specifically disclosed herein without departing from its spirit or essential characteristics. The described embodiments are to be considered in all respects only as illustrative and not restrictive.

The invention claimed is:

1. A fiber optic connector assembly comprising:
    a. a triple clad fiber having a proximal and distal end, defining a length therebetween; the fiber comprising a core, an inner cladding in direct contact with the core, a second cladding adjacent to inner cladding, and an outer cladding adjacent to the second cladding; wherein a proximal portion of the length of the fiber is adjacent the proximal end of the fiber;
    b. wherein along the proximal portion of the length of the fiber the outer cladding has been removed, defining a proximal length of the fiber and an exposed outer surface of the second cladding along the proximal length, the outer surface comprising contaminants; and,
    c. the proximal length positioned within an inner cavity of a connector, whereby the contaminants are located between an inner surface of the connector and the outer surface of the second cladding;
    d. whereby, the contaminants are shielded by the second cladding from laser energy in the inner cladding; thereby minimize detrimental thermal effects from laser-contaminant interactions.

2. The fiber connector assembly of claim 1, wherein the connector comprises an end cap and the proximal end of the fiber is optically connected to the end cap.

3. The assembly of claim 2, wherein the proximal end of the fiber is optically connected to a single clad fiber.

4. The assembly of claim 3, wherein the optical connection is a splice.

5. The assembly of claim 2, wherein the single clad fiber comprises a mode stripper.

6. The assemblies of claim 1, 2, 3, 4 or 5 wherein the contaminants cover more than about 5% of a surface of the proximal length of the fiber.

7. The assembly of claim 1 wherein the contaminants cover more than about 10% of an outer fiber surface that is in contact with an inner surface of the connector.

8. The connector of claim 1, wherein the connector is configured to transmit laser energy for a total duration of at least 1,000 hours without causing detrimental thermal effects.

9. The connector of claim 1, wherein the connector is configured to transmit laser energy for a total duration of at least 500 hours without causing detrimental thermal effects.

10. A fiber optic connector assembly comprising:
   a. a fiber having a proximal and distal end, defining a length therebetween; the fiber comprising a core, an inner cladding in direct contact with the core, a second cladding adjacent to inner cladding;
   b. the second cladding comprising an area along the length of the fiber, wherein an outer surface of the fiber is contaminated with contaminants which upon interaction with a laser beam cause thermal degradation of the fiber; thereby defining an outer contaminated area; and,
   c. the outer contaminated area in direct contact with an inner surface of a connector; whereby, the contaminants are shielded by the second cladding from laser energy in the inner cladding; thereby preventing thermal degradation of the fiber.

11. The connector of claim 10, wherein the connector is configured to transmit laser energy for a total duration of at least 100 hours without causing detrimental thermal effects.

12. The connector of claim 10, wherein the connector is configured to transmit laser energy for a total duration of at least 1,000 hours without causing detrimental thermal effects.

13. The connectors of claim 8, 11, 9 or 12, wherein the laser energy has a power of about 50 W to 1 kW.

14. The connectors of claim 8, 11, 9 or 12, wherein the laser energy has a power of about 100 W to about 500 W.

15. The connectors of claim 8, 11, 9 or 12, wherein the laser energy has a power of about 100 W to about 200 W.

16. The connectors of claim 8, 11, 9 or 12, wherein the laser energy has a power of about 150 W.

17. The connectors of claim 8, 11, 9 or 12, wherein the laser energy has a power of about 1 kW to about 20 kW.

* * * * *